Patented Dec. 5, 1944

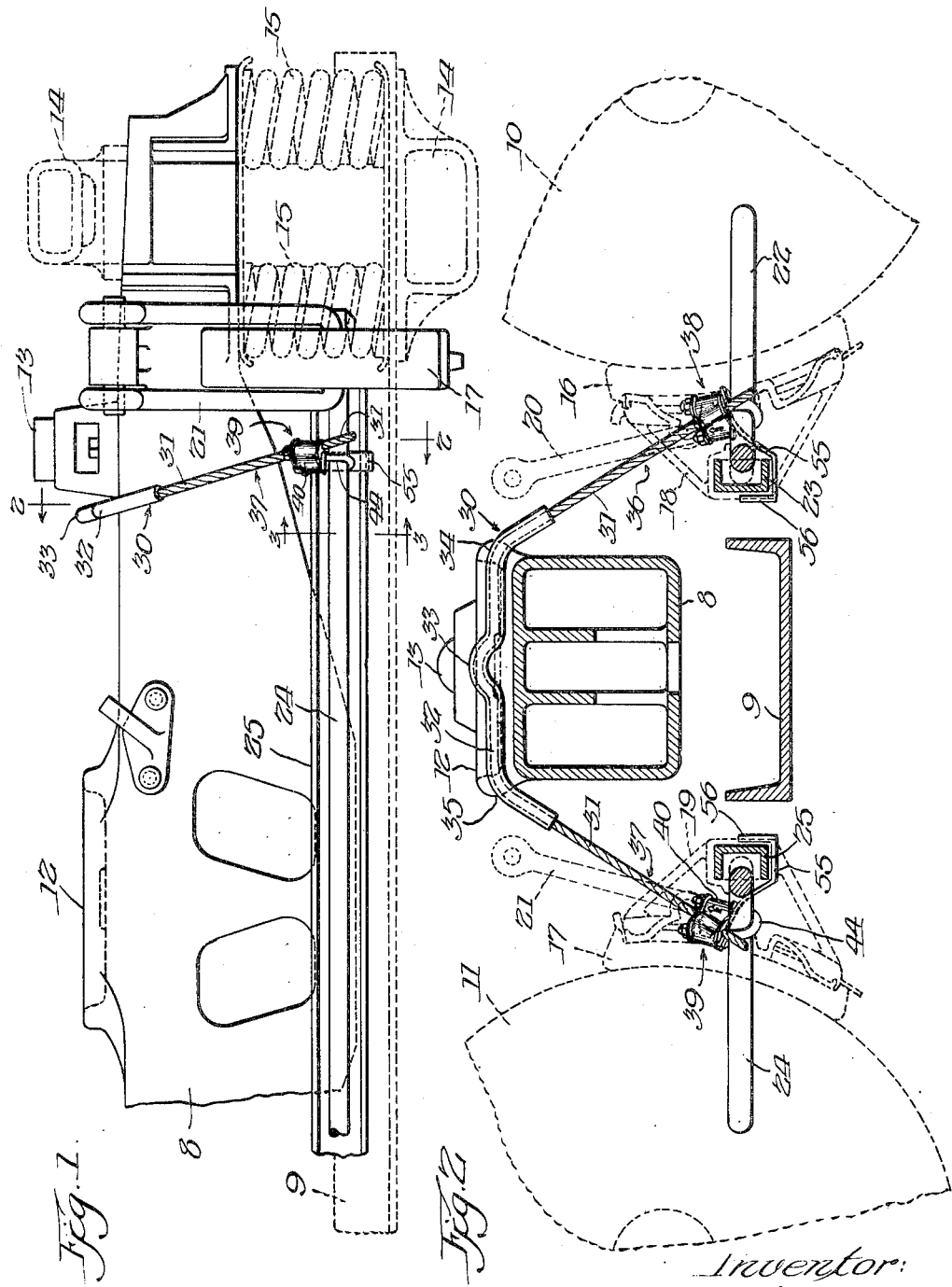

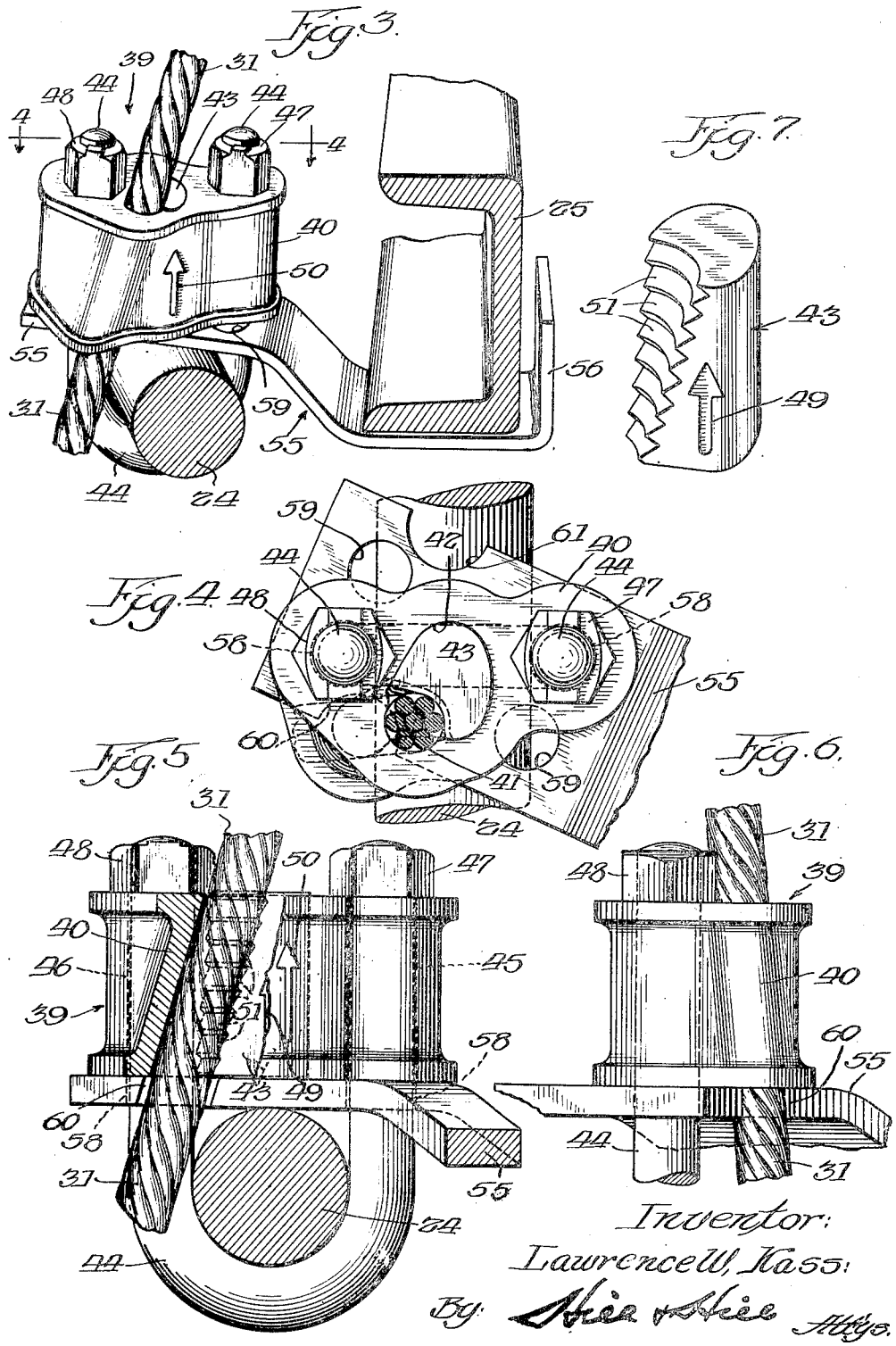

2,364,221

UNITED STATES PATENT OFFICE 2,364,221

SAFETY SUPPORT FOR BRAKE BEAMS

Lawrence W. Kass, Chicago, Ill., assignor to Grip Nut Company, Chicago, Ill., a corporation of Illinois Application October 10, 1942, Serial No. 461,538

16 Claims. (Cl. 188—210)

The present invention relates to a safety support for brake beams that is designed for a simple and convenient application, by a relatively unskilled workman having only a wrench, to the tension and compression members of the brake beams of any type of railway car truck, regardless of variations in the dimensions and structural characteristics of the truck.

Heretofore the application of brake beam safety supports to railway trucks has been a relatively difficult matter, because of the variations that occur in the dimensions and types of railway car trucks, and because equipment and skilled labor were not always available where the support was to be applied to the truck. The difficulties arose because the safety supports heretofore used were not adaptable to any truck varying materially in the dimensions or type from that for which the support was originally designed, and because welding, riveting or similar difficult operations had to be employed to apply the support to the truck. Furthermore the supports were not wholly satisfactory in use, even if initially properly applied, because the relative position of the truck parts changed after use necessitating an alteration of the support for proper functioning that could not be made in the field by relatively unskilled workmen having only such a simple tool as a wrench.

The primary purpose of the present invention is to provide a safety support for brake beams that can be easily and properly applied, without using equipment or tools that are not always at hand in the field, to any type of railway truck regardless of the variations in dimension that are prevalent in trucks in actual use, to the end that the stocking of many sizes and kinds of safety supports may be avoided and to the further end that the application of the safety supports can be greatly simplified and adjustment made in the field, when use of the truck makes this desirable, by a relatively unskilled worker having only a wrench as a tool.

The present invention as applied is provided in the form of a continuous support having its end portions connected with the oppositely related tension and compression members of the brake beams of a railway car truck. This support is preferably made with a relatively stiff run of cable which is adapted to straddle a fixed portion of the railway car bolster and is positioned in spaced relation to the bolster to prevent interference with the braking action of the brake beams and vertical movement of the bolster when the car is moving. Also, by providing the brake support, which is actually an emergency supporting unit, with the semi-flexible cable, the end portions of such support or cable will flex with the relative motions of the oppositely related brake beams whenever the application or release of the brakes of the truck shall occur.

It has been found by experience that certain variations exist in the distances between the top and sides of the bolster to the attaching points on the brake beams at which points the safety support is normally secured, and such distances may also vary whenever the safety support is not connected in the same relative lateral locations on the various brake riggings. For this reason one of the main advantages of the present invention is directly embodied in the attaching members for the support which are adapted for initially slidably cooperating with the cable and which may be positioned at some point along the cable and locked at a point to place said attaching members in the proper and desired relation with respect to the brake beam members for attachment. The adjustable clamp members as associated with the end portions of the safety support will permit the manufacture and use of a definite length of cable or supporting member by reason of the fact that all variations in the dimensions between the parts normally affected at the points where such safety support is attached can thereby be accommodated.

Another advantage is the ease and convenience with which the safety supports may be adjusted relative to their fittings when adjustments are made in bolster heights on older cars that have settled or otherwise varied through use. Since it is preferable to use a semi-flexible cable which will only permit limited flexing over a relatively long length thereof, the clamp constituting the fastening means of the cable with the tension rod of the brake mechanism has been so arranged that the aperture receiving the cable will allow the latter to avoid interfering with the tension rod and other associated parts of the clamp. Therefore, with the present fastening unit the cable is made and directed to assume a position offset axially with respect to the axial center of the tension rod and at the same time permitting the use of a cable that may overlap and by-pass said rod, and which will avoid any of the mechanisms utilized in connecting the fastening means with the tension rod.

Another of the features of the present invention resides in the provision of means connected with the clamping member which will extend between the tension rod and the compression member of the brake rigging whereby any structural or mechanical failure or accidental disconnection of the compression member with the brake assembly shall bring the additional safety means into action to prevent complete separation of the tension and compression members relative to each other, thereby also preventing the dropping of the compression member onto the rails which might result in the derailment of the car.

Various other advantages are also inherent in the design of the present construction, some of which are the permissible use of cables of one design of universal overall length for various conventional types of railway trucks, another the complete elimination of moving parts to guard against the possibility of wear thereby reducing maintenance costs to a minimum, and also the novel arrangement of the component parts of the safety support which will only subject the cable of the supporting member to tensional stresses whenever the latter truly acts in its emergency capacity which is the only time such support is subjected to a load.

All other advantages and novel features shall hereinafter be referred to in the following detailed description of the safety support with reference to the accompanying drawings.

In the drawings:

Fig. 1 is a fragmentary front elevational view of a typical railway truck and its associated brake rigging structure illustrating substantially the relation and position occupied by the safety support of my invention;

Fig. 2 is a sectional view taken substantially along the line 2—2 of Fig. 1 illustrating a number of the truck details diagrammatically and in broken lines;

Fig. 3 is an enlarged perspective view of the left hand attaching the end of the safety support of Fig. 2 illustrating its attachment and relation to the tension rod and compression member of the brake rigging;

Fig. 4 is a plan view taken substantially along the plane of the line 4—4 in Fig. 3;

Fig. 5 is a side elevational view of Fig. 4 as viewed by looking substantially at right angles to the plane of the U-bolt fastening member, with the fitting partially broken away and in section.

Fig. 6 is a fragmentary elevational view taken at 90 degrees to that illustrated in Fig. 5, and Fig. 7 is a perspective view of the locking wedge utilized for securing the cable clamping member of the fastening device to the cable of the safety support.

Referring to Figs. 1 and 2 of the drawings, wherein the conventional type of railway truck is illustrated, the truck briefly comprises a bolster 8, spring plank 9 and the conventional wheels 10 and 11 pivotally positioned at opposite sides of the bolster 8. The bolster 8 is provided with the usual center bearing 12 and side bearings such as at 13, and is supported on the side frames 14 of the truck by means of the usual nests of springs 15.

A typical brake rigging consists of a brake beam on each side of the bolster, the usual hangers, brake heads and brake shoes at each end of each beam. In Fig. 2, the brake shoes 16 and 17 are supported by the brake heads 18 and 19 respectively, and are positioned by the hangers 20 and 21 to actively engage and brake the wheels 10 and 11, respectively. A tension rod 22 and compression member 23 are connected and associated with the shoe 16 and head 18 in the usual manner while another tension rod 24 and compression member 25 are associated with the brake shoes 17 and brake head 19 in the same manner. The usual operating levers and rods employed with the brake rigging are not illustrated as these form no part of the present invention and are well known in the art.

The safety support for the operating members of the brake beam is best illustrated in Fig. 2 indicated generally by the reference numeral 30 and extends between the oppositely related brake beams and is adapted to straddle and overhang the truck bolster 8 as shown in Figs. 1 and 2. The safety support primarily consists of a run of cable 31 with a sheathing member 32 interposed intermediate the length thereof, said sheathing member having a suitable kink 33 formed therein which cooperates with the bent corners 34 and 35 of the sheath to prevent any slippage of the cable within the sheathing member 32. The sheathing member divides the cable into a non-flexible portion and two depending flexible end portions 36 and 37 which cooperate with the clamping units 38 and 39, respectively.

Referring now more particularly to Figs. 3 to 7 inclusive, each of the clamping members such as 39 is provided with a body in the shape of a fitting 40 which is provided with a cored center aperture having a diagonally located recess 41 for accommodating and nesting the cable 31, the opening 41 being flanked by a contiguous and additional opening 42 which is adapted to accommodate the wedge 43 illustrated, per se, in Fig. 7. By placing the fitting 40 upon the cable with the latter slidable in the opening 41 and by inserting the wedge 43, the fitting 40 may be located at any desirable point along the end of cable 31 and in a position where the U-bolt 44, which is insertable through openings 45 and 46 in the fitting 40, can be tightly secured about the tension rod 24 by means of the nuts 47 and 48 of the U-bolt 44. The insertion of the wedge is guided by the matched arrows 49 on the wedge in Fig. 7, and 50 on the fitting in Figs. 3 and 5 which are adapted to direct the manner of insertion of the wedge as well as to its relative location with respect to the fitting when inserting the same in the opening 42 to lock the fitting upon the cable. In this connection, attention is also directed to the plurality of teeth 51 formed on the cable contacting side of the wedge which are arranged to partially encircle the cable and are adapted to bite into the same to prevent the cable from pulling out of the fitting. At the same time any possible movement of the wedge by said cable will be counteracted by the tightening of the wedge within the fitting, so that it is practically impossible to withdraw the cable from within the fitting.

As best illustrated in Figs. 4, 5 and 6, it should be noted that the angular placement and location of the opening 41 and the configuration of the wedge and its respective coaction with the opening 42 in the fitting 40 are all so devised as to place the cable in a position where the excess portion thereof that may project from the bottom of the fitting will be disposed in axial offset relation with respect to the tension rod 22 and also to readily clear the U-bolt 44. This eliminates all interference of the cable and rod, and also provides a clamp member which can be secured to the cable without bending the latter, and any abnormal pull or weight to which the cable may be subjected when acting in its emergency capacity will merely act as a direct tensional pull on the cable all of which is apart from the slight flexing of the cable that takes place during the operation of the brakes of the railway truck. The latter flexing is induced over a considerable length of the cable and, therefore, will be substantially ineffective as to causing any weakness which might lead to failure of said cable.

Attention is further directed to the disposition of a diagonally disposed opening 41 which is such that the cable will at all times freely avoid any interference with the U-bolt fastening member 44, so that the attachment of the cable by means of the clamp to the tension rod 24 may easily and readily be accomplished with the excess portion of the cable merely projecting into space.

As an additional safety measure, the present safety support is provided with an extended safety bracket 55 that can be clamped between the fitting 40 and the tension rod 24, and which extends outwardly to a point underneath the compression member 25 as best illustrated in Figs. 2 and 3. This bracket 55 is provided with an upstanding end 56 to prevent any relative movement of the tension rod and compression member away from each other in case of mechanical or accidental structural failure that may be caused by the breakage of the tension rod 24 and the possible pulling away of the compression member 25 from the brake head. As best viewed in Fig. 2, the end portions of the tension rod 24 normally terminate substantially within the confines of the compression member 25 and in the event of failure of either of these members, the rod and compression member will be substantially maintained in this cooperative relation by means of the bracket 55 which, of course, receives its support through the cable 31 and the cable sheath 32 as the latter will be resting upon the bolster 8 whenever failure of either one of the members 24 or 25 or both shall occur.

The portion of the bracket 55 which is engaged by the U-bolt 44 is provided with two complementary sets of angularly related openings 58 and 59 as a universal feature, so that the angularity of the bracket 55 may readily be shifted to suit for the right and left hand attachments of the attaching members 40 between the outside ends of the diagonally related tension member 24 and compression member 25. Bracket 55 is also laterally notched as at 60 and 61 to clear the cable. Individual right and left hand brackets may also be used in place of the one shown.

Having thus described the invention, it is obvious that various immaterial modifications may be made in the same without departing from the breadth and scope of the invention; hence, it is to be understood that the device of the present invention should not be limited to the exact form, construction, arrangement and combination of parts herein shown and described, or to the specific uses mentioned.

What I claim as new and desire to secure by Letters Patent is:

1. A safety support for the brake beams of a car truck comprising a semi-rigid member shaped to straddle the bolster of the truck in spaced relation thereto with its opposite end portions depending therefrom, and means to attach the depending opposite end portions of said member to the brake beams, each of said means comprising a clamp adjustable along said semi-rigid member, and gripping means in said clamp to fixedly secure it at any desired point along the length of an end portion of said member.

2. A safety support for the brake beams of a car truck comprising a semi-rigid member shaped to straddle the bolster of the truck in spaced relation thereto, and means to attach opposite end portions of said member to the brake beams, each of said means comprising a housing having a clamp to attach it to a beam and a passage offset from said clamp for said member and an insert slidable with said member in said passage to fixedly secure the housing at any desired point along the length of an end portion of said member.

3. A safety support for the brake beams of a car truck comprising a semi-rigid cable, and a pair of housings adjustable along said cable and provided with clamps to attach them to the brake beams, each of said housings having a passage through which an end of said cable is passed and wedge means inserted in said passage and impinging against a wall of said passage and the cable to securely grip the cable at any desired point along the length thereof.

4. A safety support for the brake beams of a car truck comprising a semi-rigid cable, a pair of housings provided with clamps to attach them to the brake beams, each of said housings having a passage through which an end of said cable is passed, means inserted in each passage to securely grip the cable at any desired point along the length of an end portion thereof, and a bracket secured by each of said clamps and formed with a part arranged to underlie and support the compression member should it become disengaged from the brake head.

5. A safety support for the brake beams of a car truck comprising a run of semi-flexible cable, a sheathing member intermediate the length thereof, and cooperative clamping members adjustably securable at points along each unsheathed length of said cable, each of said clamping members comprising a housing having a passage therethrough for the cable, and a wedge block impinged against a wall of said passage and the cable and fastening means secured to said housing for fixed connection with said brake beams to freely support said cable in spaced relation about a fixed portion of said car truck.

6. A safety support for the brake beams of a car truck comprising a run of semi-flexible cable, a sheathing member intermediate the ends of said cable dividing the run thereof into a non-flexing portion and two flexing end portions, and clamping units connected with the end portions of said cable and secured to oppositely related brake beams for supporting said cable over a fixed section of said car truck, said clamping units each comprising a body surrounding the cable, wedge means in said body for immovably securing said body at a point on said cable, and means for securing said body and cable to the adjacent brake beam.

7. A supplemental emergency support for brake beams of a car truck comprising a continuous cable adapted for overlying a fixed portion of the car truck and terminating adjacent each of the brake beams of said truck, and fastening means each connecting an end portion of said cable to the corresponding brake beam and comprising a body member initially slidable along the cable, wedge means in said body member impinging against said cable for fixedly securing said body to said cable at a fixed point and to dispose the body in a fixed relation to the adjacent brake beam, and means for releasably securing said body to said latter brake beam.

8. A supplemental emergency support for brake beams of a car truck comprising a continuous cable adapted for overlying a fixed portion of the car truck and terminating adjacent each of the brake beams of said truck, and fastening means each connecting an end portion of said cable to the corresponding brake beam and comprising a fitting adjustable along said cable, a toothed wedge member cooperating between said fitting and cable to lock the fitting against movement relative to said cable, said teeth on said wedge member being adapted to counteract withdrawal of said cable from said fitting by functioning to tighten the wedge when said cable is tensioned, and means for securing said fitting to the adjacent brake beam.

9. A supplemental emergency support for brake beams of a car truck comprising a continuous cable adapted for overlying a fixed portion of the car truck and terminating adjacent each of the brake beams of said truck, and fastening means each connecting an end portion of said cable to the corresponding brake beam and comprisng a fitting having an aperture for slidably receiving said cable, a wedge member coacting between said cable and said fitting to lock the latter in fixed relation at a point on said cable, and means for securing said fitting to the adjacent brake beam and substantially at right angles to said beam, said aperture for said cable being angularly disposed within said fitting to permit said cable to by-pass said brake beam.

10. A supplemental emergency support for brake beams of a car truck comprising a continuous cable adapted for overlying a fixed portion of the car truck and terminating adjacent each of the brake beams of said truck, and fastening means each connecting an end portion of said cable to the corresponding brake beams and comprising an apertured fitting having one aperture therein for receiving said cable, means for locking said fitting at a fixed point on said cable and at a definite position with respect to the adjacent brake beam, and a U-bolt encircling said brake beam and connected with said fitting through certain other of the apertures to secure said fitting to said brake beam, the aforesaid one aperture for said cable being angularly disposed with respect to the other aperture for said U-bolt whereby said cable is located in axial offset relation with respect to the axis of said brake beam and whereby said cable may be disposed to by-pass said beam and said U-bolt.

11. A supplemental emergency support for the groups of tension and compression members of brake rigging for a car truck comprisig a supporting element adapted for overlying a portion of said car truck and terminating near each oppositely related group of tension and compression members, and fastening units each connecting the terminal end portions of said supporting element to an adjacent tension member, each of said fastening units comprising a body having a passage therethrough for adjustably receiving said cable, wedge means in said body impinging upon said supporting element for locking said body at a fixed point on said supporting element, means for securing said body to said tension member, and a bracket connected with said fitting and having a part extending under said compression member in spaced relation thereto as an auxiliary safety support for the latter in the event of a mechanical failure in the brake rigging beam.

12. A supplemental emergency support for the groups of tension and compression members of brake rigging for a car truck comprising a supporting element overlying a portion of said car truck and terminating near each oppositely related group of tension and compression members, and fastening units each connecting the terminal end portions of said supporting element to an adjacent tension member, each of said fastening units comprising a body having a passage therethrough for receiving said cable, wedge means in said body for locking said body at a fixed point on said supporting element, means for securing said body to said tension member, and a bracket connected with said body and extending under said compression member in spaced relation thereto as an auxiliary safety support for the latter in the event of a mechanical failure in the brake rigging, said bracket having means connected therewith to prevent said compression and tension members from moving away from each other in the event of such failure.

13. In a device of the class described for providing a supplemental support for the tension and compression members of a brake rigging, the combination of a cable, a body slidable on said cable, means in said body for securing said body against movement relative to the cable, means for securing said body to one of said members, and bracket means connected with said body and having a flanged part cooperating with the other of said members to hold and support said other member in the event of a mechanical failure and to also keep said two members from moving away from one another during such failure.

14. In a device of the class described for providing a supplemental support for the tension and channeled compression members of a brake rigging wherein the end portions of said tension member are normally disposed within the channeled compression member, the combination of a supporting cable, means initially shiftable along said cable and into engagement with one of said members, friction means for locking said shiftable means against movement relative to the cable, and means for securing said shiftable means to one of said members and including a cooperable bracket strap having a flanged part for coacting with the other of said members whereby said supplemental support may act to hold one or both of said members in the event of mechanical failure thereof and whereby said members are maintained with the ends of one held in the channel portion of the other after such failure.

15. A supplemental emergency support for the groups of tension and compression members of brake rigging of a car truck comprising a supporting element adapted for overlying a portion of said car truck and terminating near each oppositely related group of tension and compression members, and fastening units each connecting the terminal end portions of said supporting element to an adjacent tension member, each of said fastening units comprising a body for receiving said cable, wedge means for adjustably locking said body at a fixed point on said cable, securing means for attaching said body to said tension member, and a bracket interposed between said fitting and said tension member and having a flanged part extending under said compression member in spaced relation thereto to provide an auxiliary support for said member in the event of displacement of the latter, the aforesaid securing means also functioning to tightly clamp said bracket between said body and said tension member.

16. A safety support for the brake beams of a car truck comprising a semi-rigid cable shaped to straddle the bolster of the truck in spaced relation thereto with the opposite end portions depending therefrom, and means to attach the depending opposite end portions of said cable to the tension rods of the brake beams, each of said means comprising a housing having a passage therethrough for the cable, and a wedge block wedgingly seated in said passage and impinging upon a wall thereof and the cable, and a U-bolt secured to said housing with the tension rod clamped between the U-bolt and housing.

LAWRENCE W. KASS.